United States Patent [19]

Asano

[11] 3,993,261

[45] Nov. 23, 1976

[54] FILM WIND-UP MECHANISM FOR PHOTOGRAPHIC CAMERA

[75] Inventor: Seizi Asano, Okegawa, Japan

[73] Assignee: Fuji Photo Optical Co., Ltd., Omiya, Japan

[22] Filed: Nov. 10, 1975

[21] Appl. No.: 630,431

[30] Foreign Application Priority Data

Nov. 8, 1974 Japan ........................ 49-135234[U]

[52] U.S. Cl. .................................. 242/71; 354/206; 354/213

[51] Int. Cl.² ........................ G03B 1/08; G03B 1/14

[58] Field of Search ............................. 242/71–71.6; 354/206, 213

[56] References Cited

UNITED STATES PATENTS

| | | | |
|---|---|---|---|
| 3,750,545 | 8/1973 | Beach | 354/213 |
| 3,774,513 | 11/1973 | Ettischer et al. | 354/213 X |
| 3,820,142 | 6/1974 | Beach | 354/206 |
| 3,845,493 | 10/1974 | Hackenberg et al. | 242/71.4 X |

*Primary Examiner*—Stanley N. Gilreath
*Assistant Examiner*—John M. Jillions

[57] ABSTRACT

A film wind-up member is released to return to the initial position either when the perforation detecting means detects the perforation of the film or when the detecting means is accidentally moved by friction with the surface of the film or the like. When the perforation detecting means detects the perforation or is accidentally moved, the film wind-up operation is stopped and the wind-up member is allowed to return to the initial position.

2 Claims, 5 Drawing Figures

FILM WIND-UP MECHANISM FOR PHOTOGRAPHIC CAMERA

BACKGROUND OF THE INVENTION

1. Field of the Invention

This invention relates to a film wind-up mechanism for a photographic camera, and more particularly to a film wind-up mechanism for winding up a film having one perforation per one image frame.

2. Description of the Prior Art

In a film wind-up mechanism for winding up a film having one perforation per one frame, it is known to stop a wind-up member and release the same to allow it to return to the initial position when the çompletion of film wind-up is detected by a detecting means which falls into the perforation. In the conventional film wind-up mechanism, there is a defect in that when the detecting means accidentally works to transmit a signal of wind-up conpletion owing to friction between the detecting means and the surface of the film or the like, the wind-up member is stopped but not released to return to the initial position. Therefore, the film wind-up means is locked in the course of the wind-up operation.

SUMMARY OF THE INVENTION

In view of the above described defect inherent in the conventional mechanism, the primary object of the present invention is to provide a film wind-up mechanism in which a film wind-up member is released to return to the initial position even when the wind-up member is accidentally stopped due to accidental misoperation of a perforation detecting means.

The film wind-up mechanism in accordance with the present invention is characterized in that the film wind-up member is released to return to the initial position either when the perforation detecting means detects the perforation of the film or when the detecting means is accidentally moved by friction with the surface of the film or the like. When the perforation detecting means detects the perforation or is accidentally moved, the film wind-up operation is stopped and the wind-up member is allowed to return to the initial position. In case that the film wind-up member is accidentally stopped in the course of film wind-up operation, the film can be further wound up after the wind-up member is returned to the initial position.

DESCRIPTION OF THE PREFERRED EMBODIMENT

Figure 1:
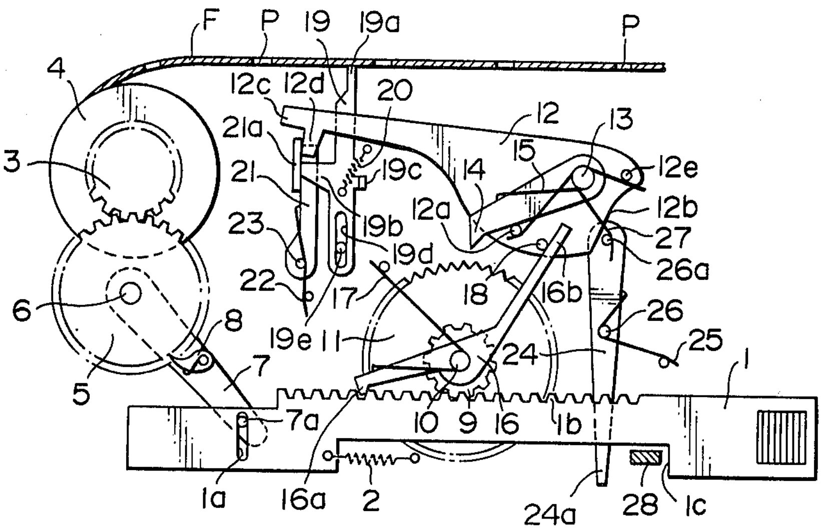
FIG. 1 is a plan view showing the film wind-up mechanism in accordance with an embodiment of the present invention in which all elements are in the ready position.

Referring to FIGS. 1 to 5 which show the main part of the film wind-up mechanism in accordance with one embodiment of the present invention, a film wind-up member 1 is slidably provided in a camera body and spring-urged to the right by a tension spring 2 in the drawing. A film take-up gear 3 integrally fixed to a film take-up spool 4 is meshed with a relay gear 5 which is rotatably mounted to a shaft 6. A swing lever 7 is pivotally mounted to the shaft 6 and a pin **7*a* fixed at an end thereof is engaged with a vertically extending elongated hole 1*a* provided in the film wind-up member 1. The swing lever 7 is provided with a feed claw 8 spring-urged to be engaged with the teeth of the relay gear 5 so that the relay gear 5 may be rotated clockwise to rotate the film wind-up gear 3 counterclockwise to wind up the film F wound on the film take-up spool 4 by the leftward movement of the film wind-up member 1. The film wind-up member 1 is provided with teeth 1*b* on one side thereof which is meshed with a pinion 9 rotatably mounted to a fixed shaft 10 and fixed to a stop gear 11 of large diameter rotatable about the same shaft 10.**

Figure 3:
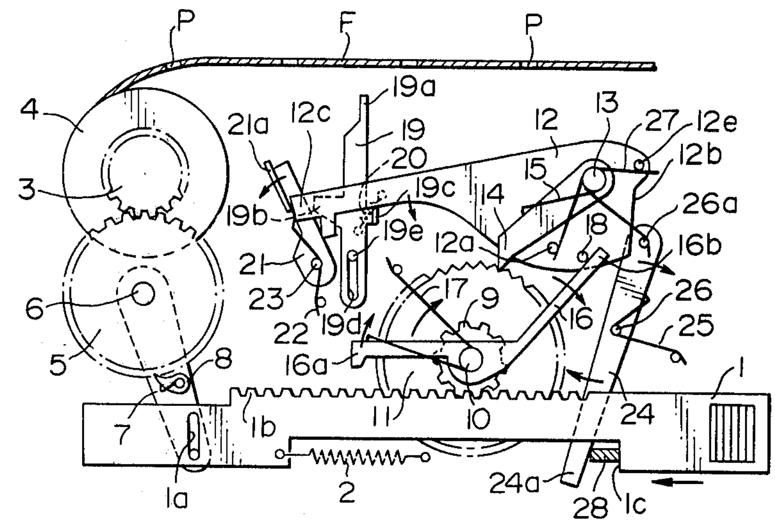
FIG. 3 is a plan view showing the mechanism wherein the film wind-up operation is completed.
Figure 4:
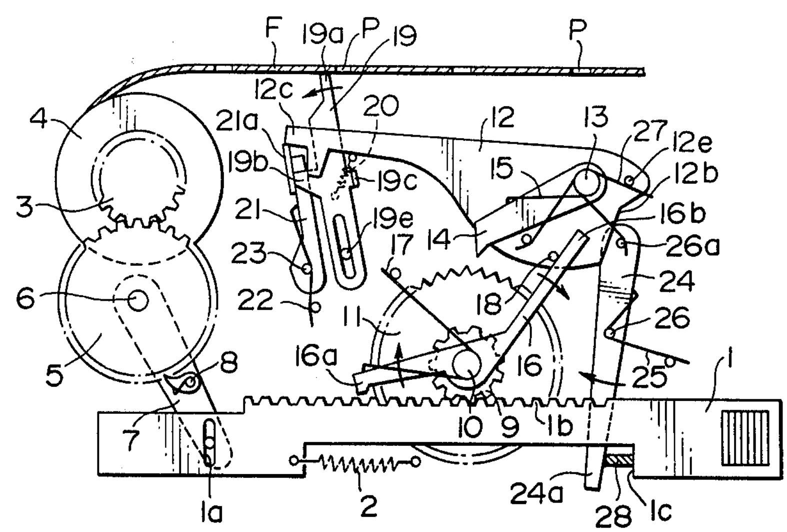
FIG. 4 is a plan view showing the mechanism wherein the perforation detecting member is accidentally moved by the surface of the film.
Figure 5:
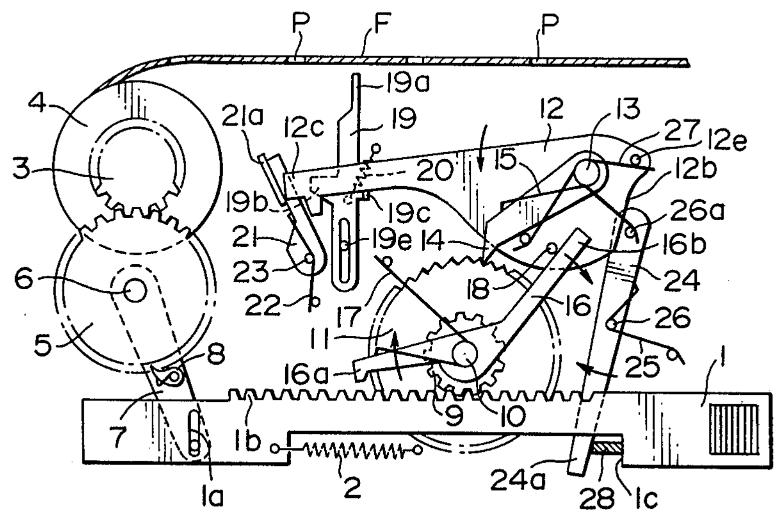
FIG. 5 is a plan view showing the mechanism wherein an engaging member connected with the perforation detecting member is accidentally moved and the film wind-up operation is stopped and the wind-up member is allowed to return.

An operating lever 12 is pivotally mounted on a fixed shaft 13 and is swingable between four positions. In the first position as shown in FIG. 1, the film wind-up member 1 is allowed to move leftward to wind up the film and is prevented from moving to the right. In the second position as shown in FIG. 4, the film wind-up member 1 is allowed to move in both directions. In the third and fourth positions as shown in FIGS. 5 and 3, respectively, the film wind-up member 1 is stopped and prevented from moving further to the left but is allowed to return to the right.

A stop lever 14 is pivotally mounted to said fixed shaft 13 and spring-urged counterclockwise by a spring 15. The counterclockwise rotation of the stop lever 14 is limited by a stopper pin **12*a* fixed to the operating lever 12. When the operating lever 12 is in said third or fourth position, the stop lever 14 is engaged with the stop gear 11 to prevent the clockwise rotation thereof and accordingly the leftward movement of the film wind-up member 1.**

A block lever 16 is pivotally mounted on said fixed shaft 10 and spring-urged counterclockwise by a spring 17. One end of the block lever 16 has a hook **16*a* to be engaged with the teeth 1*b* of the film wind-up member 1 and the other end thereof is formed into an arm 16*b* to be engaged with an engaging pin 18 fixed to said operating lever 12. The block lever 16 is vibrated to swing back and forth when the film wind-up 1 is moved to the left to wind up the film and blocks the member 1 to prevent the return thereof. The block lever 16 is rotated clockwise by the pin 18 on the operating lever 12 and the hook 16*a* thereof is separated from the teeth 1*b* of the film wind-up member 1 to allow it to return to the right when the operating lever 12** is in said second, third or fourth position.

A perforation detecting member 19 having a detecting end **19*a* to fall into a perforation P of the film F is provided to be in pressure contact with the surface of the film F being spring-urged by a tension spring 20. The detecting member 19 has a sidewardly extending portion 19*b* on one side thereof, a vertically bent portion 19*c* on the other side thereof and an elongated hole 19*d* at an end opposite to said detecting end 19*a*** which hole 19$d$ is engaged with a fixed pin 19$e$ and accordingly is movable away from the film F and swingable about the fixed pin 19$e$. An engaging member 21 is pivotally mounted to a shaft 23 and urged clockwise by a spring 22. The engaging member 21 has a vertically bent portion 21$a$ to be engaged with said sidewardly extending portion 19$b$ of the detecting member 19.

A release lever 24 is pivotally mounted to a fixed shaft 26 and spring-urged counterclockwise by a strong spring 25 which works to urge the release lever 24 counterclockwise to make a pin 26$a$ fixed at an end thereof push an end 12$b$ of the operating lever 12 to the left to rotate the lever clockwise. By the force of the urging spring 25, the operating lever 12 is held in the first position as shown in FIG. 1 in which the other end 12$c$ of the operating lever 12 is separated from said bent portion 21$a$ of the engaging member 21. An extended portion 12$d$ is engaged with the bent portion 21$a$ of the engaging member 21 in this position. A spring 27 is engaged with said pin 26$a$ on the release lever 24 and a pin 12$e$ fixed to the operating lever 12 so as to urge the operating lever counterclockwise and urge the pin 26$a$ to be in contact with the end 12$b$ of the operating lever 12.

A shutter charge lever 28 which is movable in the direction parallel to the slide direction of the film wind-up member 1 is provided extending normal to the drawing sheet between the lower end 24$a$ of the release lever 24 and a stepped portion 1$c$ of the film wind-up member 1 so that the shutter charge lever 28 may be moved to the left to charge the shutter when the film wind-up member 1 is moved to the left. The shutter charge lever 28 finishes charging of the shutter when it is moved to the position as shown in FIG. 3 and held in the position until the shutter is released. Since the shutter charge lever 28 is located between the lower end 24$a$ of the release lever 24, the shutter charge lever 28 rotates the lever 24 clockwise in the course of charging operation of the shutter.

Figure 2:
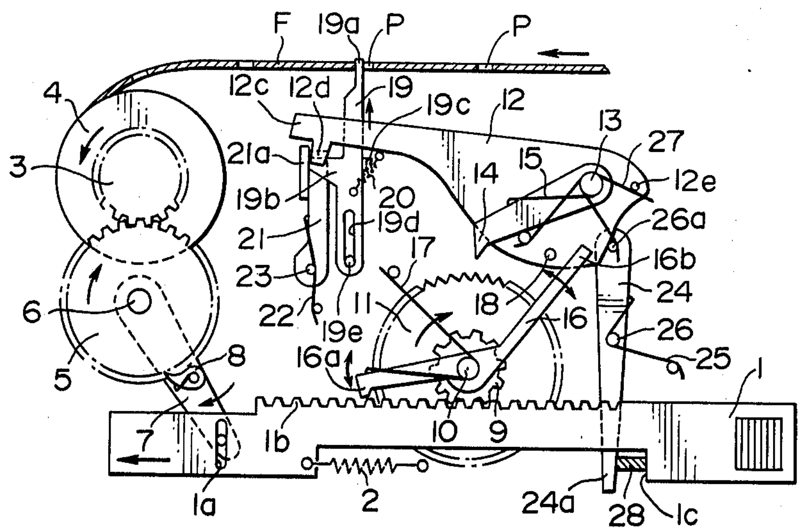
FIG. 2 is a plan view showing the mechanism wherein a perforation detecting member is engaged with a perforation of the film in the course of film wind-up operation.

Now the operation of the above described mechanism will be described in detail with reference to FIGS. 1 to 5. FIGS. 1 to 3 show a normal operation of the mechanism in which the perforation detecting member 19 detects the perforation of the film, and FIGS. 4 and 5 show unusual operations of the mechanism in which the perforation detecting member 19 is accidentally moved by a part of the film.

When the film wind-up member 1 is moved to the left overcoming the tension of the spring 2 from the position shown in FIG. 1 to the position shown in FIG. 2, the swing lever 7 is rotated clockwise to rotate the take-up gear 3 counterclockwise to take up the film F on the take-up spool 4 by way of the feed claw 8 and the relay gear 5. When the film F is taken up on the take-up spool 4 by nearly one frame, the detecting end 19$a$ of the perforation detecting member 19 falls into the perforation P of the film F as shown in FIG. 2.

By further moving the film wind-up member 1 to the left, the film F is further taken up by the take-up spool 4 and accordingly the perforation P of the film F moves the detecting end 19$a$ of the detecting member 19 leftward and makes the sidewardly extending portion 19$b$ of the detecting member 19 push the engaging member 21 leftward. Thus, the engaging member 21 is moved away from the position to block the end 12$c$ of the operating lever 12 and allows the lever 12 to rotate counterclockwise as shown in FIG. 3. Since the release lever 24 is rotated clockwise by the shutter charge lever 28 when the film wind-up member 1 is further moved to the left, the operating lever 12 is able to rotate counterclockwise to separate the detecting member 19 from the film F and the lever 12 is stopped by the bent portion 19$c$ of the detecting member 19 which has been moved down to the position where it is stopped by the pin 19$e$. Thus, the operating lever 12 is moved to said fourth position. In the fourth position, the stop lever 14 falls into engagement with the stop gear 11 to stop the clockwise rotation of the stop gear 11 and accordingly the leftward movement of the film wind-up member 1. In addition, the pin 18 fixed to the operating member 12 makes the block lever 16 swing clockwise by the counterclockwise rotation of the operating lever 12 and separates the hook 16$a$ of the block lever 16 from the teeth 1$a$ and allows the film wind-up member 1 to return to the right to the initial position. When the film wind-up member 1 is released from an external force to urge it to the left, it is returned to the initial position by the tension of the spring 2. The release lever 24 is left at the position shown in FIG. 3 since the shutter charge lever 28 is held in the charged position. When the shutter is released, the shutter charge lever 28 and the release lever 24 are moved to the initial position as shown in FIG. 1 and the operating lever 12 is rotated clockwise thereby to separate the stop lever 14 from the stop gear 11 and put the block lever 16 into engagement with the teeth 1$b$ of the film wind-up member 1.

Now the unusual operations of the mechanism in which the detecting member 19 is accidentally moved by the film F will be described in detail with reference to FIGS. 4 and 5.

When the perforation detecting member 19 is slightly moved to the left in the course of film wind-up operation as shown in FIG. 4, the operating lever 12 is stopped at the second position where the end 12$c$ thereof abuts on the bent portion 21$a$ of the engaging member 21 even if when the release lever 24 is rotated clockwise to allow further counterclockwise rotation of the operating lever 12. In this position, the pin 18 of the operating lever 12 is in the position to make the block lever 16 separated from the teeth 1$b$ to allow the film wind-up member 1 to return to the right.

When the perforation detecting member 19 is moved to the left farther than that moved in the case shown in FIG. 4, the engaging member 21 is moved away from the position to block the end 12$c$ of the operating lever 12 as shown in FIG. 5. In this case, the operating lever 12 is rotated counterclockwise to the third position where the end 12$b$ is stopped by the pin 26$a$ of the release lever 24. In this position also, the stop lever 14 is engaged with the stop gear 11 and stops the film wind-up operation and the pin 18 of the operating lever 12 is engaged with the arm 16$b$ of the block lever 16 to make the hook 16$a$ thereof separated from the teeth 1$b$ of the film wind-up member 1 to allow it to return to the right.

Under the condition as shown in FIG. 4 wherein the operating lever 12 is in the second position, the film F can further be taken up on the take-up spool 4 by continuing the film wind-up operation. Under the condition as shown in FIG. 5 wherein the operating lever 12 is in the third position, the film F can further be taken up by returning the film wind-up member 1 to the initial position once and then further moving the wind-up member 1 to the left.

I claim:

1. A film wind-up mechanism for a photographic camera wherein a film having one perforation per frame is used comprising:

a film wind-up member movable between a start position and an end position, said film wind-up member being spring-urged to the start position, film take-up means connected with said film wind-up member for taking up a film in the camera in response to the movement of said film wind-up member from said start position to the end position, a perforation detecting means urged to be in contact with the surface of the film, said perforation detecting means falling into the perforation and moved in the direction of the film movement when the perforation comes to be in engagement therewith or the friction between the surface of the film and the detecting means exceeds a predetermined value, blocking means for preventing the film wind-up member from returning to the start position movable between a working position to block the film wind-up member and a non-working position, stopping means for stopping the movement of the film wind-up member toward the end position movable between a working position to stop the film wind-up member and a non-working position, operating means connected with said blocking means and said stopping means, said operating means being movable between first, second and third positions, in the first position said blocking means being in the working position and said stopping means being in the non-working position, in the second position both said blocking means and stopping means being in the non-working position, in the third position said blocking means being in the non-working position and said stopping means being in the working position, engaging means movable from an initial position to an engaging position to stop said operating means in said second position in the course of movement thereof from said first position to said third position and a non-engaging position to allow the movement thereof from the first position to the third position, said engaging means being associated with said detecting means to be moved from the initial position to the engaging position when the detecting means is moved in the direction of the film movement by the friction between the detecting means and the surface of the film and from the initial position to the non-engaging position when the detecting means falls into the perforation of the film, and release means provided between said film wind-up member and said operating means for allowing the movement of the operating means from said first position to said third position when the film wind-up member is moved from said start position to said end position.

2. A film wind-up mechanism for a photographic camera as defined in claim 1 wherein said operating means is an operating lever having a first pin and a second pin, said first pin being engaged with said stopping means for allowing the stopping means to move to said working position when the operating lever is moved to said third position, said second pin being engaged with said blocking means for moving the blocking means from said working position to said non-working position when the operating lever is moved to said second position.

* * * * *